United States Patent
Andrew et al.

(10) Patent No.: US 6,618,693 B2
(45) Date of Patent: Sep. 9, 2003

(54) METHOD AND APPARATUS FOR NON-INTRUSIVE MONITORING OF ROTATING COMPONENTS

(75) Inventors: Philip Lynn Andrew, Glenville, NY (US); Ramani Mani, Niskayuna, NY (US); Hyoun-Woo Shin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/863,020

(22) Filed: May 23, 2001

(65) Prior Publication Data

US 2002/0177979 A1 Nov. 28, 2002

(51) Int. Cl.$^7$ .............................................. G06F 15/00
(52) U.S. Cl. ........................ 702/188; 702/182; 702/185
(58) Field of Search ................................ 702/182–189, 702/190, 191, 192, 193, 199, 138, 146; 60/239, 268, 269; 415/1, 26, 30, 51

(56) References Cited

U.S. PATENT DOCUMENTS

| | | | |
|---|---|---|---|
| 3,891,915 A | * | 6/1975 | Yannone et al. ............ 60/39.27 |
| 4,283,634 A | * | 8/1981 | Yannone et al. ............. 702/130 |
| 5,726,891 A | | 3/1998 | Sisson et al. |
| 6,059,522 A | * | 5/2000 | Gertz et al. ..................... 415/1 |
| 6,092,029 A | | 7/2000 | Bently |
| 6,098,010 A | | 8/2000 | Krener et al. |

* cited by examiner

Primary Examiner—Bryan Bui
(74) Attorney, Agent, or Firm—Nixon & Vanderhye

(57) ABSTRACT

A non-intrusive method of monitoring the integrity of a rotating member comprising mounting at least one sensor in a stationary frame of reference in a casing over the rotating member, measuring the pressure field of the rotating member, comparing the measured pressure field with a corresponding reference pressure field, identifying variations in the measured pressure field, the variations indicative of a fault in the rotating member, and generating an output indicative of an identified fault.

12 Claims, 6 Drawing Sheets

METHOD AND APPARATUS FOR NON-INTRUSIVE MONITORING OF ROTATING COMPONENTS

FIELD OF THE INVENTION

This invention relates to non-intrusive techniques for monitoring the integrity of rotating mechanical components. More particularly, the present invention relates to a method and apparatus for monitoring the mechanical integrity of rotating components of a machine by monitoring the pressure fields generated by the rotating components.

BACKGROUND OF THE INVENTION

The recent deregulation in the power-generation industry has resulted in the formation of a spot market in electricity, wherein, during periods of heavy demand, the price offered for this commodity may be temporarily elevated by an order of magnitude over common levels. Recently, this approach has allowed the owners of several new power generation plants to literally pay for those assets in a short period of time. Consequently, the spot market, and end users desire to service the power generation market placed an added emphasis on the availability and reliability of the equipment to ensure that it is operational and available to meet the periods of peak demand. This scenario is true and equally applicable to other industries.

During operation of power generation equipment, several factors may likely lead to faults, thus causing machinery breakdown. Damage to compressor blades because of resonant (high-cycle fatigue) blade failures, foreign object damage (FOD), blade tip/casing rubs, and the like lead to compressor inefficiency and forced outages.

Land-based gas turbines used for power generation a compressor must be allowed to operate at a higher pressure ratio in order to achieve a higher machine efficiency. A compressor stall, as identified above with respect to aircraft turbines, may also occur in land-based gas turbines. Similar to the problems faced during the operation of aircraft gas turbines, if a compressor stall remains undetected and permitted to continue, the combustor temperatures and vibratory stresses induced in the compressor may become sufficiently high to cause damage to the turbine.

Thus, there is a need for a method and apparatus to non-invasively monitor the integrity of machinery components to determine the cause of performance degradation without disassembling the entire machinery.

BRIEF SUMMARY OF THE INVENTION

Accordingly, the present invention is directed to a method and apparatus for non-invasively monitoring the integrity of an axial flow compressor by measuring the pressure fields generated by rotating compressor blades. A plurality of sensors are disposed about the compressor casing for measuring the pressure fields generated by each of the rotating blades of a blade row, the measured pressure field indicative of the integrity of the blade.

In one embodiment, the measured pressure signature from a single sensor is compared with respective baseline reference pressure signature to identify deviations from the reference values. Deviations in the measured contours are identified to determine faults in rotating components of the compressor. The present invention adds granularity to the concept of non-invasive monitoring by ascertaining the root cause of changes in performance without disassembly of operating machinery.

In another embodiment, the obtained pressure signature from a blade passage is compared to an average signature of the entirety of blade passages from a given blade row at a given point of time. Any variations in the comparison are identified to indicate a fault in a rotating blade.

In yet another embodiment, the present invention may be used to detect the mechanical spallation of thermal barrier coatings (TBC's) integrity of the rotating blades of a rotor in a gas turbine.

In a further embodiment, the present invention may be used to monitor periodic aerodynamic phenomena, such as for example, the occurrence of rotating stall on start-up of axial compressors.

In one aspect, the present invention provides a non-intrusive method of monitoring the integrity of a rotating member, comprising mounting at least one sensor in a stationary frame of reference in a casing over the rotating member; measuring a pressure field generated by the rotating member; comparing the measured pressure field with a reference value; identifying variations in the comparison step, the variations indicative of a fault in the rotating member; and generating an output indicative of an identified fault. The method further includes performing phase averaging of measured pressure fields to remove interference signal content, storing in real-time the measured pressure field data in a memory system; and freezing the memory system to protect the integrity of the stored data in the event of a failure.

In another aspect, in a compressor having a plurality of rotating blades, a method of monitoring the integrity of the rotating blades comprising disposing at least one sensor about the rotating blades to measure a pressure field of a rotating blade; comparing the measured pressure field with corresponding reference value to identify variations in the measured pressure field; and generating an output indicative of variations in the measured pressure field.

In yet another aspect, the present invention provides a non-intrusive method of monitoring the integrity of a rotating member of a gas turbine of the type having a compressor with a plurality of rotating members, a generator, and a turbine, according to various embodiments of the invention.

In a further aspect, an apparatus for monitoring the integrity of rotating components of a gas turbine, comprising at least one sensor operatively coupled to the compressor to measure the pressure fields of rotating components; a processor system operatively coupled to the at least one sensor for performing phase averaging of the measured pressure fields; and a comparator operatively coupled to the processor system for comparing the measured pressure field data with a reference value. The apparatus further comprises a user interface coupled to the comparator for identifying a faulty rotating component in the event of a deviation in the measured pressure field of the rotating component from the reference value. The sensor is preferably a dynamic pressure sensor or a hot wire anemometer.

In another apsect, a non-intrusive apparatus for monitoring the integrity of a rotating member, comprising: means for measuring the pressure fields of the rotating member; means for comparing the measured pressure fields with a reference value to identify a fault in the rotating member; and means for generating an output indicative of the identified fault. The apparatus further comprises means for performing phase averaging of measured fields to remove random signal content.

In yet another aspect, a non-intrusive apparatus for monitoring the mechanical integrity of a rotating member of a compressor, comprising at least one sensor operatively coupled to the compressor for measuring compressor parameters; a comparator operatively coupled to the at least one sensor for comparing the measured compressor parameters to corresponding reference values to identify a faulty rotating member; and a user interface coupled to a processor system for displaying an identified fault.

In a further aspect, a non-intrusive method of monitoring the integrity of a rotating member among a plurality of rotating members, comprising mounting at least one sensor in a stationary frame of reference in a casing over the rotating members; measuring the pressure fields of each of the rotating members of a blade row; performing an average of the measured pressure field; comparing the measured pressure field of a rotating member with the average pressure field; identifying a faulty rotating member in the event of a mismatch in the comparison step; and generating an output indicative of an identified fault.

The benefits of the present invention will become apparent to those skilled in the art from the following detailed description, wherein only the preferred embodiment of the invention is shown and described, simply by way of illustration of the best mode contemplated of carrying out the invention.

DETAILED DESCRIPTION OF THE INVENTION

Figure 1:
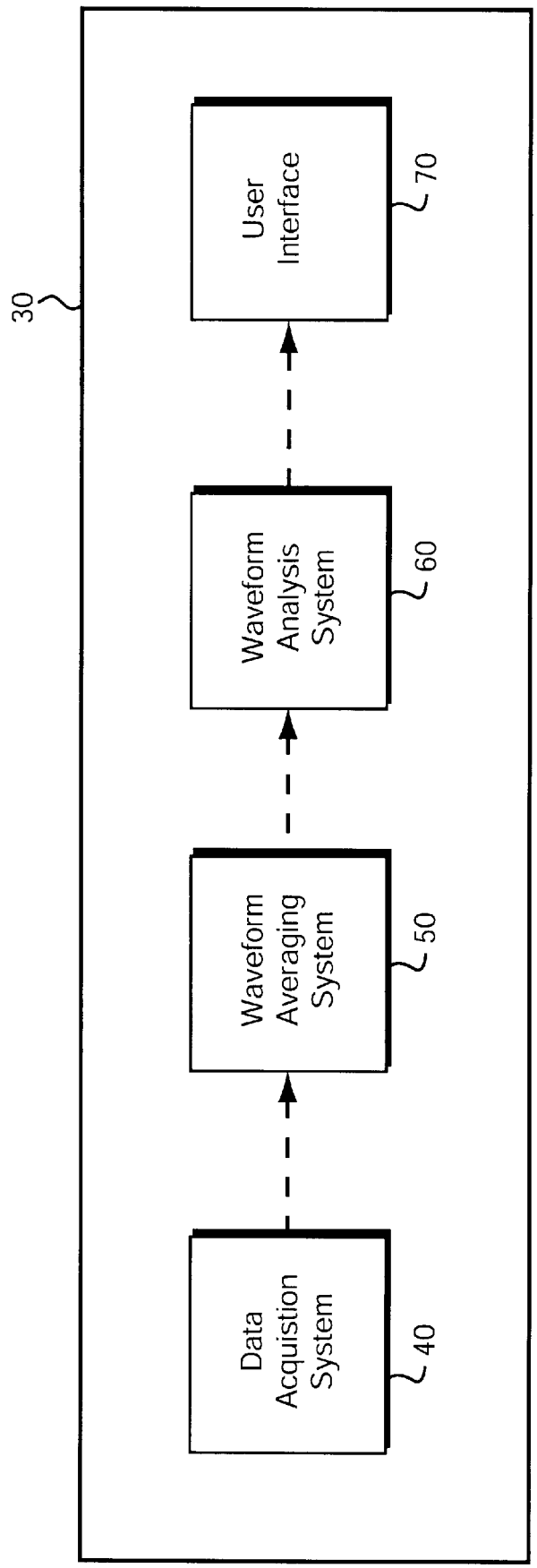
FIG. 1 illustrates a high level block diagram of the present invention.
Figure 2:
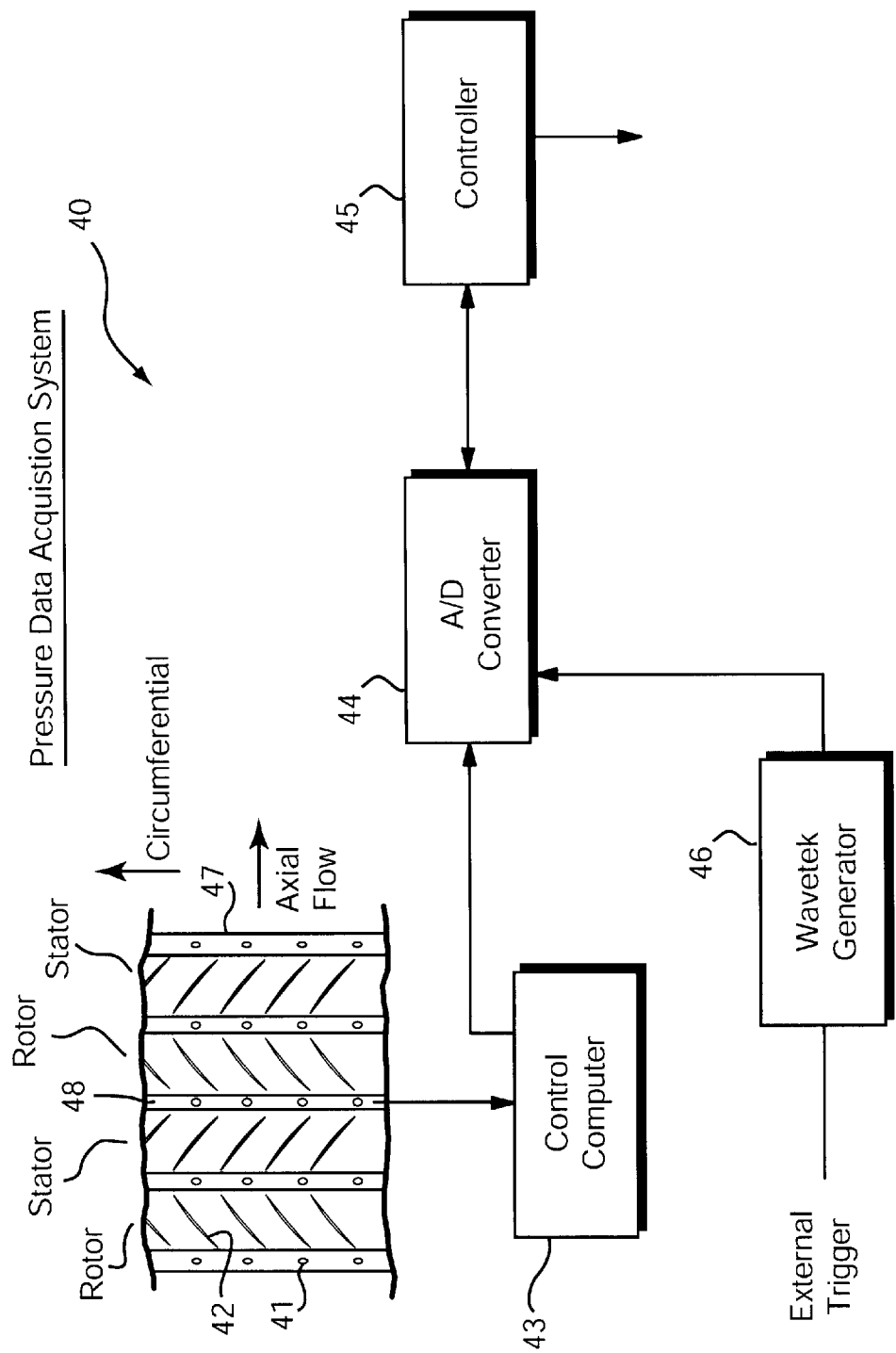
FIG. 2 shows pressure data acquisition system of the present invention.

Referring to FIG. 1, there is shown a high level block diagram as indicated at 30 of the present apparatus for non-intrusively monitoring the integrity of rotating blades 42 (FIG. 2). Apparatus 30 includes data acquisition system 40 for collecting pressure data produced by rotating blades 42. The data acquisition system 40 preferably includes sensors 41 (FIG. 2) for collecting compressor parameters. For convenience, the present invention will be described with respect to a single compressor of a gas turbine and data acquisition with respect to one row of blades is discussed. The pressure data collected by system 40 is averaged by system 50 to remove random variations in data due to interference. The averaged data from waveform averaging system 50 is received by waveform analysis system 60 wherein the averaged data is compared with reference data to locate a faulty rotating blade. The waveform analysis system 60 may be, for example, a comparator or the like. The processor system 50 may be, for example, a computer or a microprocessor system. Any deviations in the measured data are identified as being indicative of a fault in a rotating blade 42 (FIG. 2). A user is informed about a faulty blade via a user interface 70 such as, for example, a display device or the like.

FIG. 2 shows a data acquisition system of the present invention as illustrated in FIG. 1 wherein a few exemplary blades 42 are shown. It will be understood that several such blades are present in a blade row. Likewise, several such blade rows may exist in a single stage of a compressor. Pressure field data generated by rotating blades 42 and collected by sensors 41 is received in a signal conditioner of control computer 43. Signals received by computer 43 are amplified and forwarded to an A/D converter 44 for converting analog signals to digital signals. Sensor 41 is preferably a pressure sensor, and several such sensors may be disposed in a continuous array in casing 47 of the compressor. The control computer 43 also controls such factors as gain, amplification, offset, and supply voltage to sensors 41, appropriate selection of such factors being necessary for proper collection of pressure data. Wavetek™ generator 46 receives a signal from a gas turbine engine (not shown) and filters the received signal to produce a clean filtered signal prior to passing the filtered signal to A/D converter 44. Once a single revolution of an blade is marked, a triggering event is received in the A/D converter 44 for initiating pressure data acquisition by sensors 41.

Still referring to FIG. 2, pressure data collected by sensors 41 is processed in a waveform averaging system 50 by segmenting the data into several parcels (such as, for example, 128) corresponding to the time required for one complete revolution, and averaging those parcels, thus producing a contour. Alternatively, the data parcels may be processed, via a Fast Fourier Transform (FFT), prior to averaging by converting instantaneous low time-domain signals to instantaneous frequency-domain signals. The frequency-domain signals are then averaged to remove undesirable interferences. The A/D converter 44 may be operated by controller 45.

Figure 3:
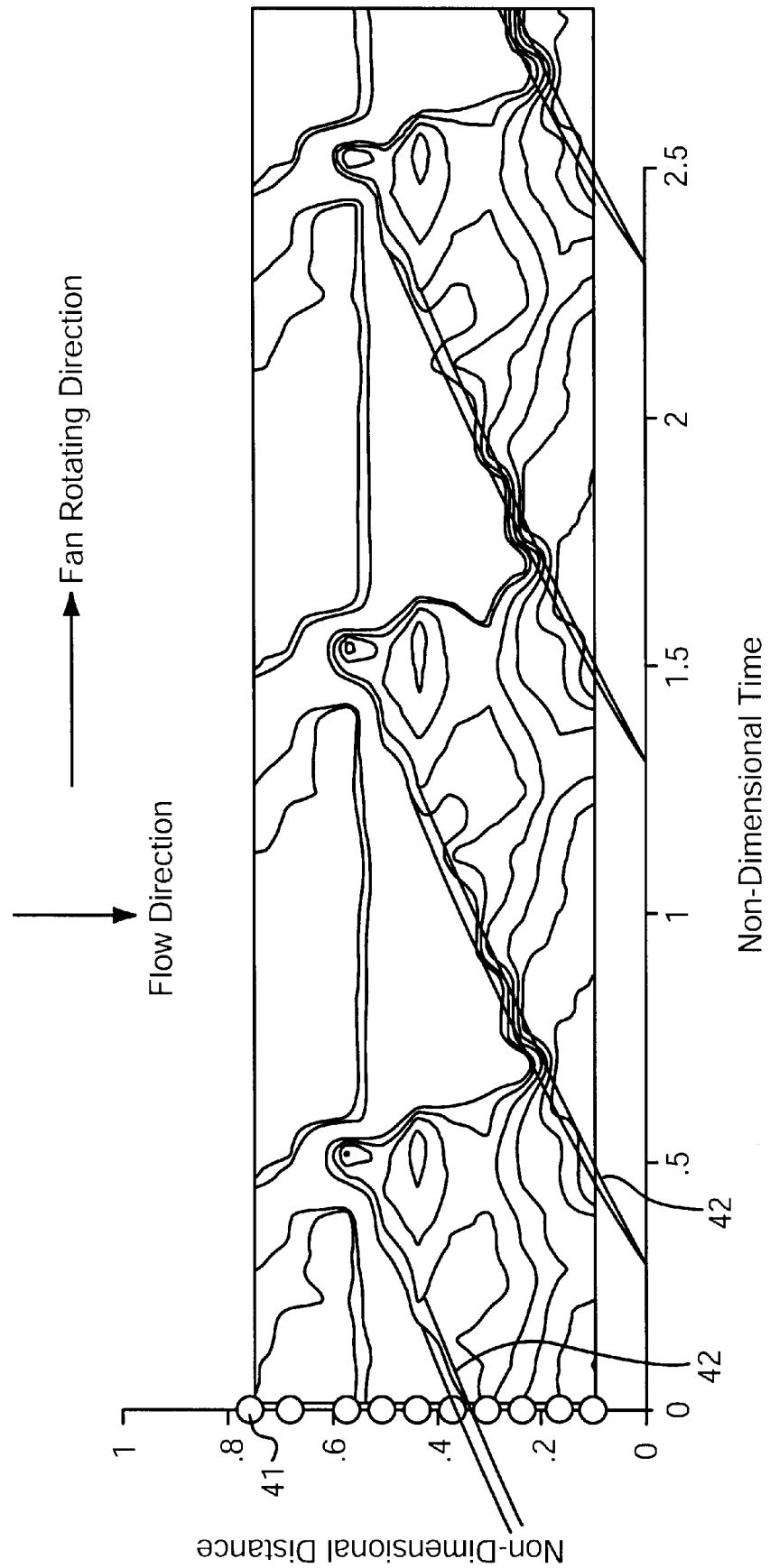
FIG. 3 illustrates an exemplary contour plot for absolute wall static pressure in three blade-to-blade passages of a given blade row in accordance witht the present invention.

FIG. 3 shows an exemplary contour plot for absolute wall static pressure for a healthy compressor produced by each of the rotating blades 42 of compressor 48 (FIG. 2). For the sake of brevity, only four blades 42 are shown. It will be understood that more than four blades may be present in a blade row. Sensors 41 are identified on the Y-axis and non-dimensional time is charted on the X-axis. In the exemplary embodiment, FIG. 3 depicts pressure contour plots of different blades within a single blade row wherein each rotating blade 42 is interrogated to monitor the differences in pressure contours indicative of the integrity of the blades 42. The sensors 41 are preferably arranged axially across the blade passage. In the exemplary arrangement shown in FIG. 3, ten sensors are used. However, the number of sensor should not be construed to be limiting of the present invention. Pressure signatures are obtained by sensors 41 as the blade 42 passes beneath the sensors 41. Each sensor 41 collects data over a particular circumferential "slice" of the blade passage. For example, the sensor over the leading edge slice is exposed to the leading edge of all of the blades in the blade row.

Figure 4:
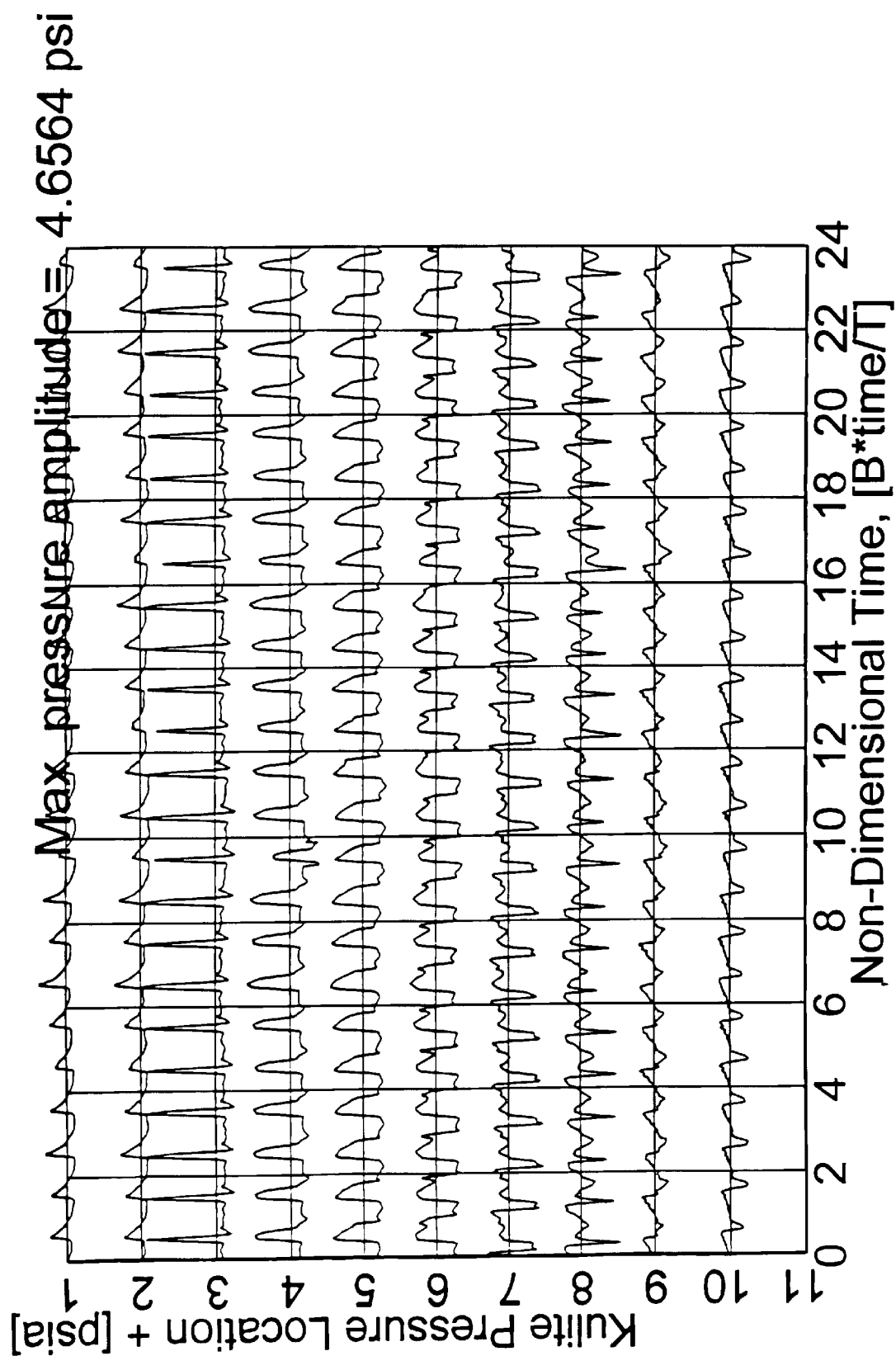
FIG. 4 illustrates a graph showing some of the data collected and synthesized to form a signature as shown in FIG. 3.

FIG. 4 shows some of the data that is collected and synthesized to form a signature as shown in FIG. 3. FIG. 4 depicts the passing of a number of individual blades beneath a plurality of sensors deployed across the blade-to-blade plane.

Figure 5:
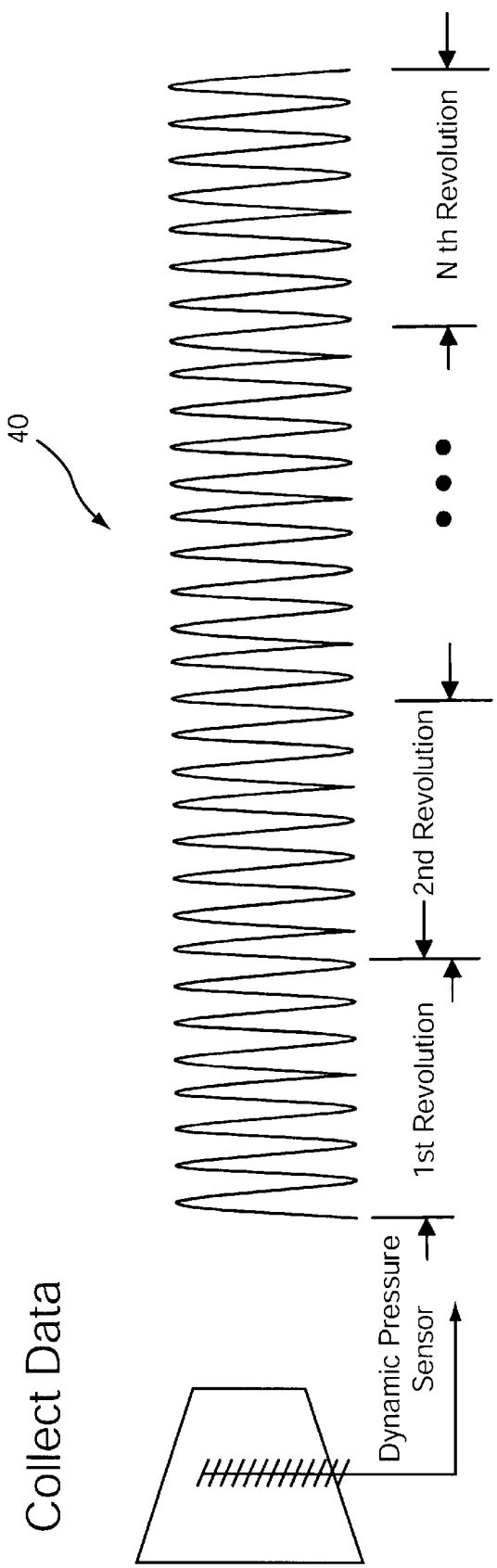
FIG. 5 illustrates a method of collecting pressure data by the data acquisition sub-system of the present invention.
Figure 6:
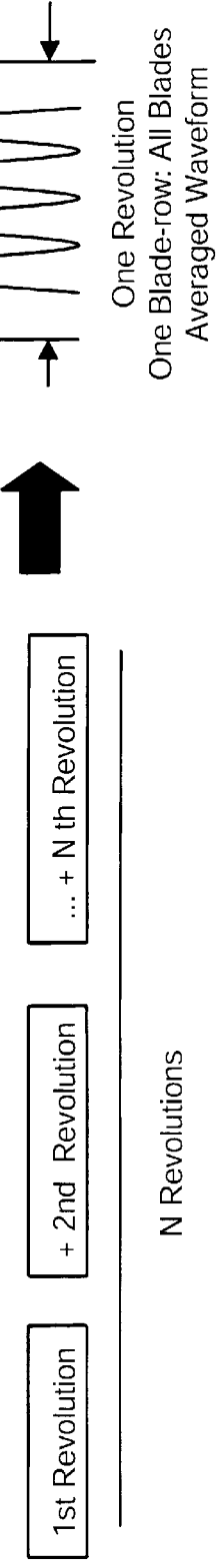
FIG. 6 illustrates a method of averaging collected pressure data as shown in FIG. 4.
Figure 7:
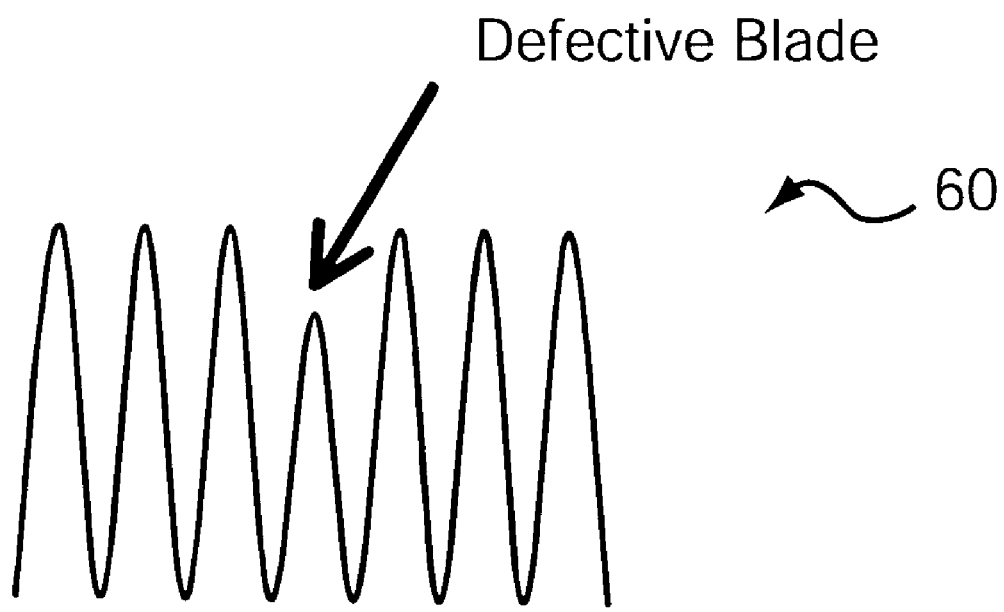
FIG. 7 illustrates a waveform resulting from phase averaging the waveform shown in FIG. 4.

FIGS. 5 and 6 illustrate the collection and averaging of the pressure data collected by sensors 41 (FIG. 2). FIG. 7 shows a waveform with a fault identified in one of the rotating blades 42. Pressure contour data measured by sensors 41 is processed in waveform analysis system 60 where the measured pressure contours are compared with reference contours to identify a faulty blade.

While the invention has been described in connection with what is presently considered to be the most practical and preferred embodiment, it will be understood that the invention is not to be limited to the disclosed embodiment, but on the contrary, is intended to cover various modifications and equivalent arrangements included within the spirit and scope of the appended claims.

What is claimed is:

1. A non-intrusive method of monitoring the integrity of a rotating member, comprising:

mounting at least one sensor in a stationary frame of reference in a casing and in sensing relation to a pressure field generated by the rotating member;

measuring the entirety of the pressure field generated by the rotating member;

performing phase averaging of the measured pressure field to remove interference signal content;

comparing the phase average of the measured pressure field with a reference value for said rotating member;

identifying variations in the comparison step, the variations indicative of a fault in the rotating member; and generating an output indicative of an identified fault.

2. The method of claim 1 further comprising:

storing in real-time the measured pressure field data in a memory system; and freezing the memory system to protect the integrity of the stored data in the event of a failure.

3. In a compressor having a plurality of rotating blades, a method of monitoring the integrity of the rotating blades comprising:

disposing at least one sensor about the rotating blades to measure the entirety of a pressure field of a rotating blade;

performing phase averaging of the measured pressure field to remove interference signals;

comparing the phase average of the measured pressure field data with a reference value unique to said rotating blades to identify a fault in said rotating blade; and generating an output indicative of said fault.

4. The method of claim 1 further comprising:

storing in real-time the measured pressure data in a memory system; and freezing the memory system to protect the integrity of the stored data in the event of a failure.

5. In a gas turbine of the type having a compressor with a plurality of rotating members, a generator, and a turbine, a non-intrusive method of monitoring the integrity of a rotating member comprising:

mounting at least one sensor in a stationary frame of reference in a casing and in sensing relation to a pressure field generated by said rotating members;

measuring the entirety of a pressure field generated by the rotating member;

performing phase averaging of measured pressure field data to remove interference signal content;

comparing the phase average of the measured pressure field data with a reference value;

identifying variations in the comparison step, the variations indicative of a fault in the rotating member; and generating an output indicative of an identified fault.

6. The method of claim 5 further comprising:

storing in real-time the measured pressure field data in a memory system; and freezing the memory system to protect the integrity of the stored data in the event of a failure.

7. An apparatus for monitoring the integrity of rotating components of a gas turbine, comprising:

at least one sensor operatively coupled to the compressor to measure the entirety of pressure fields of rotating components;

a processor system operatively coupled to said at least one sensor for performing phase averaging of said measured pressure fields to produce measured field data; and a comparator operatively coupled to said processor system for comparing the measured pressure field data with a reference value.

8. The apparatus of claim 7 further comprises:

a user interface coupled to said comparator for identifying a faulty rotating component in the event of a deviation in the measured pressure field of said rotating component from the reference value.

9. The apparatus of claim 7, wherein said sensor is a hot wire anemometer.

10. The apparatus of claim 7, wherein said sensor is a dynamic pressure sensor.

11. A non-intrusive apparatus for monitoring the integrity of a rotating member, comprising:

means for measuring the entirety of pressure fields of the rotating member;

means for performing phase averaging of measured fields to remove random signal content;

means for comparing the phase average of the measured pressure fields with a reference value to identify a fault in the rotating member; and means for generating an output indicative of the identified fault.

12. A non-intrusive method of monitoring the integrity of a rotating member among a plurality of rotating members, comprising:

mounting at least one sensor in a stationary frame of reference in a casing and in sensing relation to a pressure field generated by said rotating members;

measuring the entirety of a pressure field of each of the rotating members of a blade row;

performing phase averaging of the measured pressure fields;

comparing the phase average of the measured pressure fields of the rotating members with a reference average pressure field;

identifying a faulty rotating member in the event of a mismatch in the comparison step; and generating an output indicative of an identified fault.

* * * * *

UNITED STATES PATENT AND TRADEMARK OFFICE
CERTIFICATE OF CORRECTION

PATENT NO.    : 6,618,693 B2
DATED         : September 9, 2003
INVENTOR(S)   : Andrew et al.

It is certified that error appears in the above-identified patent and that said Letters Patent is hereby corrected as shown below:

Column 5,
Line 46, delete "claim 1" and insert -- claim 3 -- therefor.

Signed and Sealed this

Second Day of December, 2003

JAMES E. ROGAN
*Director of the United States Patent and Trademark Office*